US011135897B2

(12) United States Patent
Fischer et al.

(10) Patent No.: US 11,135,897 B2
(45) Date of Patent: Oct. 5, 2021

(54) AIR DUCT SYSTEM AND MEASUREMENT SYSTEM AND METHOD FOR DETERMINING AT LEAST ONE PARAMETER OF AN AIR FLOW EMANATING FROM AN AIR OUTLET

(71) Applicant: FORD GLOBAL TECHNOLOGIES, LLC, Dearborn, MI (US)

(72) Inventors: Dietmar Fischer, Cologne (DE); Michael Lezuo, Frechen (DE); Manfred Koberstein, Troy, MI (US); Jennifer A. Herr-Rathke, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 15/967,679

(22) Filed: May 1, 2018

(65) Prior Publication Data

US 2018/0361822 A1 Dec. 20, 2018

(30) Foreign Application Priority Data

Jun. 16, 2017 (DE) .............................. 102017210123

(51) Int. Cl.
*B60H 1/00* (2006.01)
*G01C 21/02* (2006.01)
(Continued)

(52) U.S. Cl.
CPC ..... *B60H 1/00585* (2013.01); *B60H 1/00564* (2013.01); *B60H 1/00828* (2013.01);
(Continued)

(58) Field of Classification Search
CPC ............ B60H 1/00585; B60H 1/00564; B60H 1/00828; B60H 2001/00635; B60H 1/242;
(Continued)

(56) References Cited

U.S. PATENT DOCUMENTS 5,063,787 A * 11/1991 Khuzai .................... G01F 1/44
  73/861.64
6,107,923 A   8/2000 Christol
(Continued)

FOREIGN PATENT DOCUMENTS

DE       2015241 A    12/1970
DE     19546741 A1     6/1996
(Continued)

OTHER PUBLICATIONS

English Machine Translation of DE19546741A1.
(Continued)

*Primary Examiner* — Nimeshkumar D Patel
*Assistant Examiner* — Gedeon M Kidanu
(74) *Attorney, Agent, or Firm* — Vichit Chea; King & Schickli PLLC

(57) ABSTRACT

An air duct system for passing an air flow emanating from an air outlet to a measurement device for detecting parameter measurement values for at least one parameter of the air flow, includes at least one collecting unit for collecting the air flow emanating from the air outlet. That one collecting unit can be disposed on the air outlet so that a contact surface of the collecting unit encloses at least one outlet opening of the air outlet circumferentially. The collecting unit includes a wall defining a continuous air duct with an inlet end section and an outlet end section. In order to improve the measurement of the parameter of the air flow, the air duct system includes at least one measurement chamber that is communicatively connected to a section of the air duct enclosed by the inlet end section, which, as a measurement chamber that is otherwise closed relative to the surroundings, either contains at least one pressure sensor or comprises at least one connection for communicatively connecting the measurement chamber to a pressure measurement device.

3 Claims, 4 Drawing Sheets

(51) Int. Cl.
*G01D 21/02* (2006.01)
*G01F 1/44* (2006.01)
*F02M 35/10* (2006.01)

(52) U.S. Cl.
CPC ....... *F02M 35/10386* (2013.01); *G01C 21/02* (2013.01); *G01D 21/02* (2013.01); *G01F 1/44* (2013.01); *B60H 2001/00635* (2013.01)

(58) Field of Classification Search
CPC .... B60H 1/008; B60H 1/00735; G01D 21/02; G01F 1/44; G01F 5/00; G01F 15/18; G01F 15/185; G01F 1/10; G01F 1/363; G01F 1/68; G01F 1/684; G01F 1/692; G01F 1/696; G01F 25/0007; G01N 33/0062; F02M 11/10; F02M 35/10091; F02M 35/10157; F02M 35/10222; F02M 35/1034; F02M 35/10386

See application file for complete search history.

(56) References Cited

U.S. PATENT DOCUMENTS

| | | | |
|---|---|---|---|
| 6,655,207 B1 | 12/2003 | Speldrich et al. | |
| 6,923,072 B2* | 8/2005 | Modera | G01F 1/10 73/861 |
| 9,016,075 B1* | 4/2015 | Johnson | F25B 9/06 62/87 |
| 9,689,357 B2* | 6/2017 | Crawford | F02M 35/10386 |
| 10,139,259 B2* | 11/2018 | Chen | G01N 33/0062 |
| 10,274,353 B2* | 4/2019 | Critchley | G01F 1/684 |
| 2003/0130809 A1* | 7/2003 | Cohen | A01K 1/031 702/45 |
| 2007/0220987 A1* | 9/2007 | Clifton | G01F 1/44 73/736 |
| 2014/0081549 A1* | 3/2014 | Rollinger | F02N 11/10 701/101 |

FOREIGN PATENT DOCUMENTS

| | | |
|---|---|---|
| DE | 102004019519 A1 | 11/2005 |
| JP | 2002310756 A | 10/2002 |

OTHER PUBLICATIONS

English Machine Translation of JP2002310756A.
English Machine Translation of DE102004019519A1 dated Nov. 10, 2005.
English Machine Translation of DE2015241A dated Dec. 3, 1970.
Office action dated Apr. 28, 2017 for Application No. DE102017210123.7 filed Jun. 16, 2017.

* cited by examiner

AIR DUCT SYSTEM AND MEASUREMENT SYSTEM AND METHOD FOR DETERMINING AT LEAST ONE PARAMETER OF AN AIR FLOW EMANATING FROM AN AIR OUTLET

TECHNICAL FIELD

This document concerns an air duct system for passing an air flow emanating from an air outlet, with which an air flow can be directly introduced into a passenger compartment of a vehicle, to a measurement device for detecting parameter measurement values for at least one parameter of the air flow. The air duct system includes at least one collecting unit for collecting the air flow emanating from the air outlet. The at least one collecting unit can be disposed on the air outlet so that a contact surface of the collecting unit surrounds at least one outlet opening of the air outlet circumferentially, wherein the collecting unit comprises a wall defining a continuous air duct with an inlet end section and an outlet end section.

Furthermore, this document concerns a measurement system for determining at least one parameter of an air flow emanating from an air outlet, with which an air flow can be directly introduced into a passenger compartment of a vehicle, including at least one measurement device for detecting parameter measurement values for the parameter and at least one air duct system for passing the air flow from the air outlet to the measurement device.

This document further concerns a method for determining at least one parameter of an air flow emanating from an air outlet, with which an air flow can be introduced directly into a passenger compartment of a vehicle, wherein parameter measurement values for the parameter are detected with a measurement device that is connected to the air outlet via an air duct system.

BACKGROUND

Motor vehicles are equipped with ventilation and/or air conditioning systems, in particular in order to be able to adjust an air temperature in a passenger compartment of a motor vehicle. For this purpose, a suitable system comprises air outlets, with which an air flow can be directly introduced into the passenger compartment. The air outlets can for example be disposed on a dashboard, a center console or in the footwell of the passenger compartment. The air outlets can be supplied with air individually or in groups and can comprise adjustment means for adjusting the direction and/or the strength of the respective air flow emanating therefrom.

In order to be able to detect the state of a ventilation and/or air conditioning system of a motor vehicle, it is known to connect a measurement device to an air outlet for measurement of a parameter of an air flow via an air duct and to detect parameter measurement values for the parameter during the operation of the ventilation and/or air conditioning system. Based on the measured parameter measurement values, an assessment can be made as to whether the ventilation and/or air conditioning system is operating properly. For example, it can be determined whether a fan of the ventilation and/or air conditioning system is applying a certain power and/or whether the air flow flowing to the air outlet is attenuated, for example by a contaminated air filter or similar. If this is the case, maintenance of the ventilation and/or air conditioning system is necessary.

As a rule, an accurate measurement of a parameter of an air flow emanating from an air outlet of a motor vehicle is not usually possible. In particular, the measurement can be adversely affected by an occurring air leak and/or by the occurrence of turbulences occurring as a result of flow edges in the air duct. In addition, a conventional air duct usually produces a pressure drop in the air flow, whereby the measurement of the parameters is affected and is thus inaccurate.

U.S. Pat. No. 6,655,207 B1 discloses an integrated module for the measurement of a volumetric flow of a gaseous or liquid fluid. The module comprises a flow limiter that comprises a number of openings that are matched to a flow channel of the integrated module and a sensor for measuring a property of the fluid at the flow limiter that is associated with the volumetric flow. The integrated module can be used in numerous flow systems such as reactors, ventilators and breathing protection equipment and enables better lamination of the flow and a better calibration between the flow sensor and the flow limiter in order to be able to carry out more accurate flow measurements.

U.S. Pat. No. 6,923,072 B2 discloses a fan driven by a controlled external power source, and a flow measurement device for measurement of the air flow that emanates from a grill of a HVAC system without adversely affecting the air flow to be measured. A flow director element is preferably used to eliminate any effects of an uneven or turbulent air flow profile at the fan. The revolution rate (RPM) of the fan is preferably measured to determine the air flow. The RPM/throughflow calibration of the fan is insensitive to pressure differences or the fan is a pressure sensitive fan that is subjected to suitable pressure differences. Alternatively, the voltage or the current delivered to the external power source is used to determine the air flow. Finally, the pressure difference across the flow director element can be measured to determine the air flow, whereby the influence of the pressure difference on the flow measurement device and the fan is eliminated.

U.S. Pat. No. 6,107,923 A discloses a device for detecting the state of an air filter in a heating and/or air conditioning system for the interior of a motor vehicle. The device comprises a sensor for use at the outlet of an air outlet of the system to detect the air flow emanating therefrom and a measurement device connected to the sensor for the measurement of a parameter of the air flow. The sensor comprises a housing that comprises a contact surface with a shape matching the shape of the air outlet and an outlet opening that is connected to the measurement device by means of a flexible line or a flexible duct. The housing can be released relative to the line or the duct. The contact surface is provided on the circumference thereof with a deformable coating, which is non-transmissive to air and which is made of plastic foam, for example.

DE 195 46 741 A1 discloses an air compressor measurement adapter with a base body with: (a) a compressor system side containing connectors that can be connected to a compressor inlet and a compressor outlet in a sealed and non-interchangeable manner and that can be released again, (b) a connector side that can be connected to a compressor connector element in a sealed and non-interchangeable manner and that can be released again, which compressor connector element for its part can be connected to the compressor inlet and the compressor outlet in a sealed and non-interchangeable manner and that can be released again, and (c) closable ducts through which the compressor inlet and the compressor outlet can be properly connected to the compressor connector element and that are each connected to at least one tightly sealable measurement connection.

JP 2002 310 756 A discloses a flow measurement device, with which an amount of air can be measured with high accuracy if it is disposed on a large reciprocating piston engine, wherein an adapter is disposed on the air flow measurement device for a small reciprocating piston engine. The adapter is made in the form of a resin or similar. The piston is fixed in the radial direction of an induction pipe on a second air inlet opening embodied by the adapter so that the central axis of the opening is close to the central axis of the induction pipe. Consequently, an air flow can be fed into a bypass flow duct near the central axis of the induction pipe, i.e. in a region in which an air flow speed within the induction pipe is at a maximum and is stable, in which a measurement element and a temperature sensor are disposed and installed, and the air flow measurement can be carried out with high accuracy.

SUMMARY

It is the object hereof to improve the measurement of at least one parameter of an air flow that emanates from an air outlet, with which an air flow can be directly introduced into a passenger compartment of a vehicle.

This object is achieved by an air duct system which comprises at least one measurement chamber communicating with a section of the air duct enclosed by the inlet end section, which, as a measurement chamber that is otherwise closed relative to the surroundings, either comprises at least one pressure sensor or at least one connection for a communicating connection of the measurement chamber to a pressure measurement device.

It is to be noted that the features and measures individually mentioned in the following description can be combined with each other in any technically meaningful manner and reveal further embodiments.

With the air duct system described herein, the static pressure within the air flow in the inlet end section can be determined. By suitably connecting one or more pressure measurement points of the air duct system to a measurement device via one or more lines, it can be achieved that the static pressure within the air flow in the inlet end section can be directly detected by the measurement device. Consequently, the measurement errors in parameter values occurring as a result of the pressure drop within the air duct system can be compensated, so that very accurate determination of the state of a ventilation and/or air conditioning system in the vehicle is possible.

Alternatively, it is possible to compare the initial static pressure with the static pressure that can be directly determined by means of the measurement device at the air inlet of the measurement device in order to determine from said comparison a pressure drop within the air duct system or the collecting unit and to carry out a correction during the analysis of detected parameter values.

For example, a flow rate, a volumetric flow or a mass flow of the air flow can be detected as a parameter. At least two different parameters can also be detected, for example to make the measurement of properties of the air flow more reliable by means of redundant information.

Alternatively, the at least one measurement chamber is exclusively communicatively connected to the duct section of the air duct enclosed by the inlet end section, wherein in this case the measurement chamber comprises the at least one pressure sensor for measurement of the static pressure within the measurement chamber. Otherwise, the measurement chamber is embodied as a measurement chamber that is closed relative to the surroundings thereof. Two or more pressure sensors can also be disposed in the measurement chamber of said alternative. The at least one pressure sensor can be connected by cable or wirelessly to analysis electronics, which for example are formed by or can be connected to the measurement device. That the inlet end section of the wall of the collecting unit encloses the section of the air duct, means that the duct section is laterally bounded by the inlet end section in relation to a direction of flow of the air flow through the inlet end section.

Alternatively, the at least one measurement chamber is exclusively communicatively connected on the one hand to the section of the air duct and on the other hand via the connection to the pressure measurement device. Otherwise, the measurement chamber is embodied as a measurement chamber that is closed relative to the surroundings thereof. The pressure measurement device can comprise at least one pressure sensor, which for example is communicatively connected via a flexible line to the connection of the measurement chamber. The pressure measurement device can be embodied by or connected to the measurement device.

The collecting unit preferably collects the entire air flow emanating from the air outlet, i.e., without air of the air flow passing into the surroundings between the air outlet and the collecting unit in the connecting region. For this purpose, the collecting unit can be disposed on the air outlet so that the contact surface of the collecting unit encloses at least one outlet opening of the air outlet circumferentially and in an air-tight manner. The air flow emanating from the air outlet enters the collecting unit via the inlet end section and exits the collecting unit via the outlet end section. The collecting unit can be partly or fully manufactured in rigid form and of a plastic, a plastic composite material, a metal or a metal alloy. The wall and a wall of the collecting unit bounding the measurement chamber can be manufactured in a single manufacturing process using a rapid prototyping method.

The contact surface of the collecting unit can be at least partly formed by at least one flexible sealing element. With the collecting unit disposed on the air outlet, the sealing element comes into direct contact with the air outlet or a section of a further component of the vehicle enclosing the air outlet, whereby the collecting unit is connected to the air outlet or the component section in an air-tight manner. Owing to the flexible design of the sealing element, tolerances between the contact surface of the collecting unit and the respective surface of the air outlet or component section that comes into contact therewith can be compensated, thus ensuring that no air flow passes into the surroundings in the connecting region between the collecting unit and the air outlet or component section. The sealing element can for example be of an elastic form. The contact surface can also be partly or fully formed by two or more sealing elements. The sealing element can be bonded to the collecting unit. As a result, the sealing element can be disposed on the collecting unit in a simple manner and can be removed therefrom—for example in the case of a necessary replacement of a defective sealing element. The sealing element can for example be embodied as an adhesive strip that is glued onto the contact surface. The sealing element can at least partly be formed by a foam material. As a result, the sealing element can be of a flexible or elastic form and can adapt to the shape of the contact surface of the air outlet or an enclosing section of a component of the vehicle.

According to an advantageous embodiment, the measurement chamber is disposed on an external side of the inlet end section and is communicatively connected to the duct section via at least one through opening formed on the inlet end section, the opening area of which is smaller to an opening area of an inlet opening disposed on the inlet end section. Owing to the arrangement or fastening of the measurement chamber on the outside of the inlet end section, the unit formed by the collecting unit and the measurement chamber can be formed compactly. The measurement chamber can also be communicatively connected to the section of the air duct via two, three, four or more through openings in the inlet end section. The at least one through opening can be embodied as a through bore with a circular opening area or can comprise an otherwise shaped round or polygonal opening area. The opening area of the through opening is preferably smaller by a multiple than the opening area of the inlet opening of the inlet end section. The opening area is preferably made so small that only a negligible part of the air flow flowing through the inlet end section can enter the through opening. The through opening extends preferably transversely, in particular perpendicularly, to a main direction of flow of the air flow flowing through the inlet end section. If only one through opening is used, it can occur that a part of the air flow flowing through the inlet end section flows in the direction of the through opening. As a result, the pressure prevailing in the measurement chamber is formed by a static pressure component and a dynamic pressure component, so that the static pressure can no longer be detected accurately. Said effect can be attenuated or eliminated by the use of two or more through openings, because averaging of the pressure values pertaining at the through openings is carried out by means of the multiple through openings.

Advantageously, a wall section bounding the measurement chamber is formed by the inlet end section. As a result, the wall section is used both for bounding the measurement chamber on at least one side and for bounding the duct section of the air duct on one side, whereby less material is necessary during the manufacture of the air duct system, which is accompanied by a reduction of manufacturing costs and the weight of the air duct system, wherein the latter simplifies the handling of the air duct system. The at least one through opening, via which the measurement chamber is communicatively connected to the section of the air duct, is preferably formed on the wall section.

According to a further advantageous embodiment, the air duct system comprises at least two measurement chambers communicatively connected to the duct section, each of which, as a measurement chamber that is otherwise closed relative to the surroundings, comprises either at least one pressure sensor or at least one connection for communicatively connecting the measurement chamber to at least one pressure measurement device, wherein the at least two measurement chambers are at least partly disposed on mutually opposite sides of the inlet end section. Accordingly, different measurement values for the static pressure in the inlet end section are detected at different measurement locations, wherein from the different measurement values any dynamic pressure component that may be contained in the measurement values that is produced by a flow of air within the air flow in a direction of flow that is different from the main direction of flow of the air flow can be filtered out from the measurement values by averaging the measurement values, in order to obtain measurement values that are as accurate as possible. The above statements for the at least one measurement chamber are transferable to each of the two measurement chambers.

A further advantageous embodiment provides that the air duct system comprises at least one adapter component, which can be connected to the collecting unit in an air-tight manner and which can be released without damage, for structurally adapting the air duct system to a measurement device that can be connected to the adapter component, wherein the collecting unit can be communicatively connected via the adapter component to the respective measurement device. As a result, one and the same collecting unit can be combined with different measurement devices in a simple manner, which improves the usability of the air duct system. The air duct system can also comprise two, three or more adapter components that can be combined with the collecting unit. In particular, the air duct system can comprise a dedicated adapter component for each embodiment version of a measurement device, so that the number of adapter components corresponds to the number of embodiment versions of the measurement devices. The adapter component can be manufactured in a rigid form and partly or fully of a plastic, a plastic composite material, a metal or a metal alloy.

The adapter components can each comprise a first coupling section, by means of which the respective adapter component can be connected to the collecting unit so as to be releasable without damage, wherein the first coupling sections of the adapter components are preferably embodied identically. Furthermore, the adapter components can each comprise a second coupling end section, by means of which the respective adapter component can be connected to the respective measurement device, wherein the adapter components can differ from each other by the embodiment of the second coupling end sections thereof alone or also further in other areas. The adapter components can preferably optionally be connected to the collecting unit in an air-tight manner. The adapter components can be of tubular form and each can comprise a continuously curved or linear air duct, through which the air flow flows. The second coupling end section of the respective air duct unit can be embodied for at least partly positive-locking acceptance of a component section of a measurement device. As a result, a secure mechanical connection between the respective second coupling section and the respective measurement device can be made in a simple manner. Said connection can be secured by means of at least one mechanical securing means.

The collecting unit can comprise a connecting section for connecting the collecting unit to the respective adapter component, wherein the connecting section and the first coupling end section of the respective adapter components can form a bayonet connector. As a result, the connection between the collecting unit and the respective adapter component can be made in a simple manner and can be released again for replacing the adapter components. Alternatively, the connection between the collecting unit and the respective adapter component can be made by means of at least one releasable mechanical means that is embodied in a different way, such as for example a threaded joint, a latching connection, a snap connection or similar. As a result, for example a positive-locking connection between the respective measurement device and the respective adapter component can be secured. The air duct system can also comprise two or more differently formed collecting units, the connecting sections of which are of the same form and that differ from each other at least in the embodiment of the contact areas thereof. The air duct system can comprise a separate collecting unit for each type of air outlet, so that the air duct system can be structurally adapted to the respective application. Because the connecting sections of the collecting units, with which the respective collecting unit can be connected to the respective adapter component, are of the same form, said adapter components can be combined with or connected to the different collecting units.

An air duct running through the collecting unit and/or the respective adapter component is preferably embodied without flow edges. As a result, the air flow can flow through the collecting unit or the adapter component without turbulences occurring in the collecting unit or the adapter component that could influence a measurement of the parameter of the air flow.

The above object is also solved by a measurement system, wherein the air duct system is embodied according to one of the aforementioned embodiments or any combination of at least two of said embodiments with each other.

The above advantages mentioned with reference to the air duct system apply accordingly to the measurement system. The measurement system can also comprise two or more differently designed measurement devices. The measurement devices can differ in that different parameters of the air flow can be measured with them. One measurement device can for example be embodied for measurement of the flow rate, the volumetric flow, the mass flow, the static pressure or the dynamic pressure within the air flow. Each measurement device can comprise a component section that can be connected to the respective adapter component, which is at least partly connected by positive locking to the second coupling end section of the respective adapter component. As a result, the respective measurement device can be connected to the respective adapter component in a simple manner. The respective measurement device comprises at least one sensor for detecting the parameter measurement values of the parameter.

According to an advantageous embodiment, the measurement system comprises at least one means of electronic analysis that is connected to the measurement device on the one hand and the pressure sensor or the pressure measurement device on the other hand and that is configured to correct the parameter measurement values using pressure measurement values detected by the pressure sensor or the pressure measurement device. This enables accurate conclusions to be drawn regarding a state of a ventilation and/or air conditioning system of a motor vehicle from the corrected parameter measurement values in order to enable the detection of whether the ventilation and/or air conditioning system is operating properly or whether maintenance or repair of the ventilation and/or air conditioning system is necessary.

According to a further advantageous embodiment, the analysis electronics are arranged to determine average pressure measurement values from at least two pressure measurement values detected by means of different measurement chambers and to use the average pressure measurement values for correction of the parameter measurement values. Owing to the averaging of the pressure values, local fluctuations of the pressure within the air flow, which can arise from the flow directions of the air deviating from the main direction of flow of the air flow, are eliminated. The average pressure measurement values that are produced as a result very accurately reflect the actual static pressure within the inlet end section.

The above object is further achieved by a method, according to which pressure measurement values for a static pressure within the air flow are detected at at least one point in an inlet region of the air duct system and are used to correct the parameter measurement values.

The advantages mentioned above with reference to the air duct system or measurement system are accordingly associated with the method. In particular, the air duct system or the measurement system can be used according to any one of the aforementioned embodiments or in any combination of at least two of said embodiments with each other to carry out the method.

An advantageous embodiment provides that the pressure measurement values are detected by means of a measurement chamber that is communicatively connected to the inlet region via at least one measurement duct running transversely to the main direction of flow of the air flow through the inlet region. The measurement duct can be embodied by an aforementioned through opening. The measurement duct can in particular run perpendicularly to the main direction of flow of the air flow. The measurement chamber can be embodied as described above. The inlet region can be formed by the inlet end section of the collecting unit that was described above.

According to a further advantageous embodiment, the pressure measurement values are detected by means of two different measurement chambers, each of which is communicatively connected to the inlet region via at least one dedicated measurement duct running transversely to the main direction of flow of the air flow through the inlet region, wherein from the pressure measurement values detected by means of the different measurement chambers, average pressure measurement values are determined that are used for correction of the parameter measurement values. Owing to the averaging of the pressure measurement values, local fluctuations of the pressure within the air flow that are caused by flow directions of the air deviating from the main direction of flow of the air flow are eliminated. The average pressure measurement values that are produced as a result reflect the actual static pressure within the inlet end section very accurately.

BRIEF DESCRIPTION OF THE DRAWING FIGURES

Further advantageous embodiments of the air duct system, measurement system and method are disclosed in the subordinate claims and the following description of the figures.

DETAILED DESCRIPTION

Figure 1:
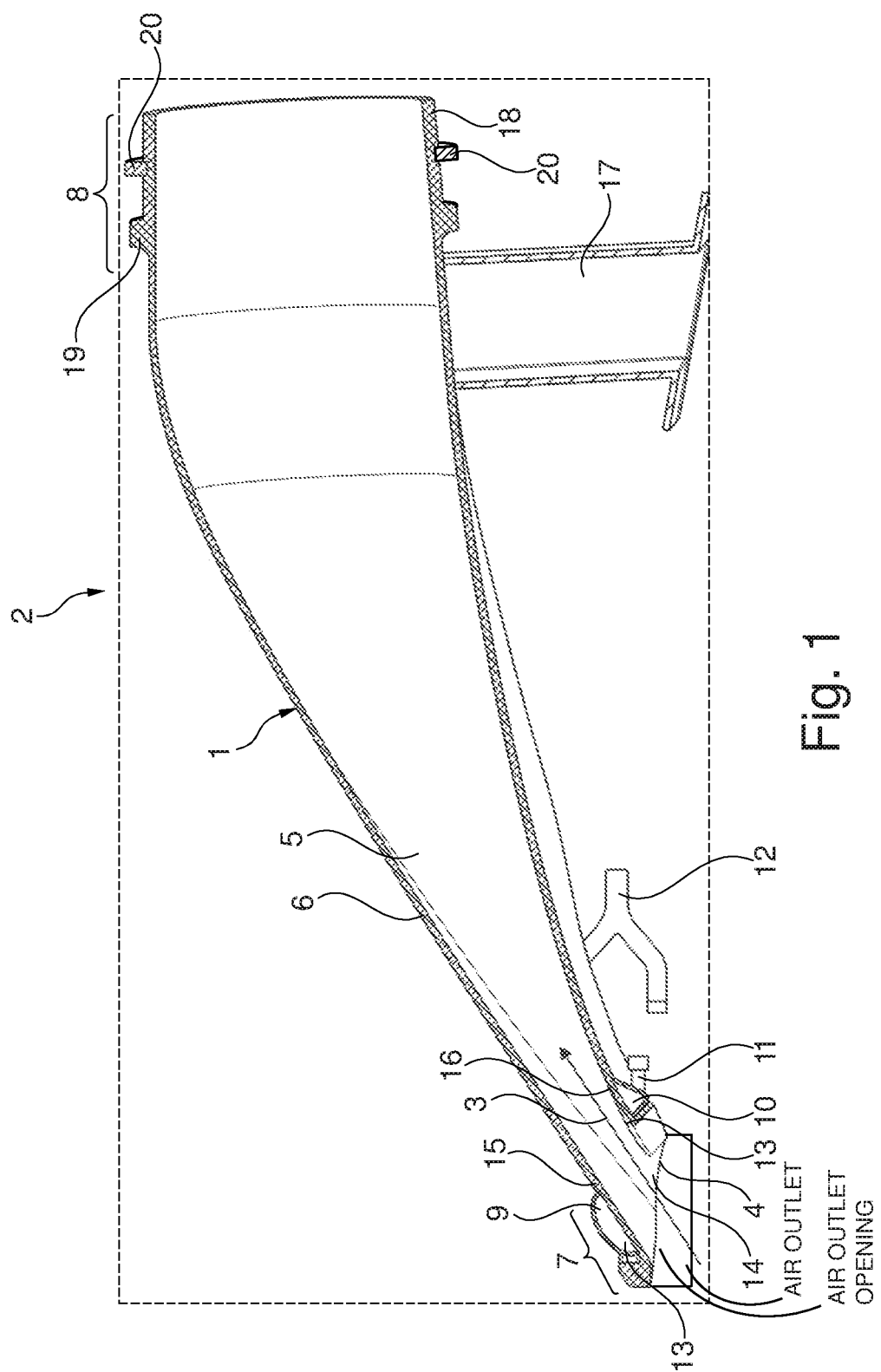
FIG. 1 shows a schematic sectional representation of an exemplary embodiment of a collecting unit of the air duct system.

In the different figures, identical parts are always described with the same reference characters, which is why the same are also only described once as a rule.

FIG. 1 shows a schematic sectional representation of an exemplary embodiment of a collecting unit 1 of an air duct system 2 for passing an air flow indicated by an arrow 3 emanating from an air outlet that is not shown, with which an air flow can be directly introduced into a passenger compartment of a vehicle that is not shown, to a measurement device that is not shown for detecting parameter measurement values for at least one parameter of the air flow.

The collecting unit 1 is used for collecting the air flow emanating from the air outlet. The collecting unit 1 can be disposed at the air outlet such that a contact surface 4 of the collecting unit 1 encloses at least one outlet opening of the air outlet circumferentially and in an air-tight manner. In particular, the collecting unit 1 can be disposed in an air-tight manner on an air outlet that is directed towards a front panel that is not shown of the motor vehicle.

The collecting unit 1 comprises a wall 6 defining a continuous air duct 5 with an inlet end section 7 and an outlet end section 8. The collecting unit 1 has two measurement chambers 9 and 10 that are communicatively connected to a section of the air duct 5 that is enclosed by the inlet end section 7. Each measurement chamber 9 or 10 is otherwise closed relative to the surroundings. Each measurement chamber 9 or 10 includes a connection 11 for communicatively connecting the respective measurement chamber 9 or 10 to at least one pressure measurement device that is not shown. For this purpose, the two measurement chambers 9 and 10 or the connectors 11 thereof can be connected to a common flexible line 12 that is connected to the pressure measurement device. In FIG. 1, only one connection 11 is shown, whereas the other connection 11 is concealed. The two measurement chambers 9 and 10 are disposed on mutually opposite sides of the inlet end section 7.

Each measurement chamber 9 or 10 is disposed on an outer side of the inlet end section 7 and is communicatively connected to the duct section of the air duct 5 via a plurality of through openings 13 formed on the inlet end section 7, the opening area of which is smaller than an opening area at an inlet opening 14 on the inlet end section 7. Here, a wall section 15 or 16 bounding the respective measurement chamber 9 or 10 on the side of the inlet end section 7 is formed by the inlet end section 7, wherein the through openings 13 are formed in said wall section 15 or 16.

The air duct system 2 has a support 17 supporting the collecting unit 1 during a measurement process relative to a base that is not shown, for example a dashboard that is not shown.

Furthermore, the air duct system 2 comprises at least one adapter component that is not shown that is connected to the collecting unit 1 in an air-tight manner and so as to be releasable without damage for structurally adapting the air duct system 2 to a measurement device that is not shown with the adapter component. The collecting unit 1 can be communicatively connected via the adapter component to the respective measurement device. The adapter component and the measurement device can be embodied according to FIG. 3 or 4. The collecting unit 1 comprises a connecting section 18 for connecting the collecting unit 1 to the respective adapter component. A peripheral stop flange 19 is formed radially externally on the connecting section 18. In addition, two bayonet protrusions 20 that are disposed circumferentially offset relative to each other are formed on the connecting section 18, by means of which a bayonet connection can be made to the respective adapter component.

Figure 2:
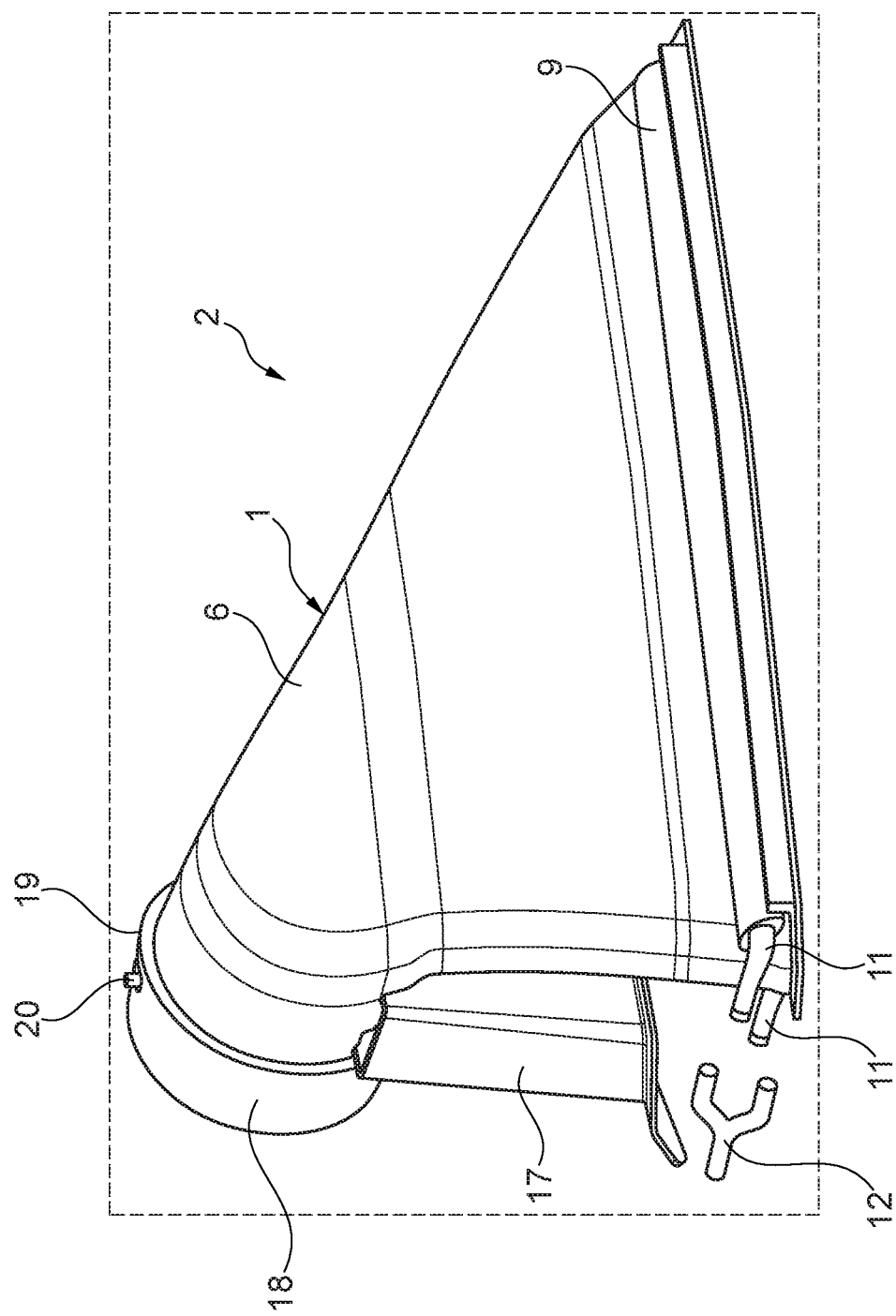
FIG. 2 shows a schematic and perspective representation of the collecting unit shown in FIG. 1.

FIG. 2 shows a schematic and perspective representation of the collecting unit 1 shown in FIG. 1. The second connection 11 of the measurement chamber 9 can be seen. The measurement chamber 10 cannot be seen. Furthermore, in conjunction with FIG. 1 it can be seen that the measurement chambers 9 and 10 are of an oblong shape, i.e. they comprise a length that is greater by a multiple than the other dimensions of the respective measurement chamber 9 or 10.

Figure 3:
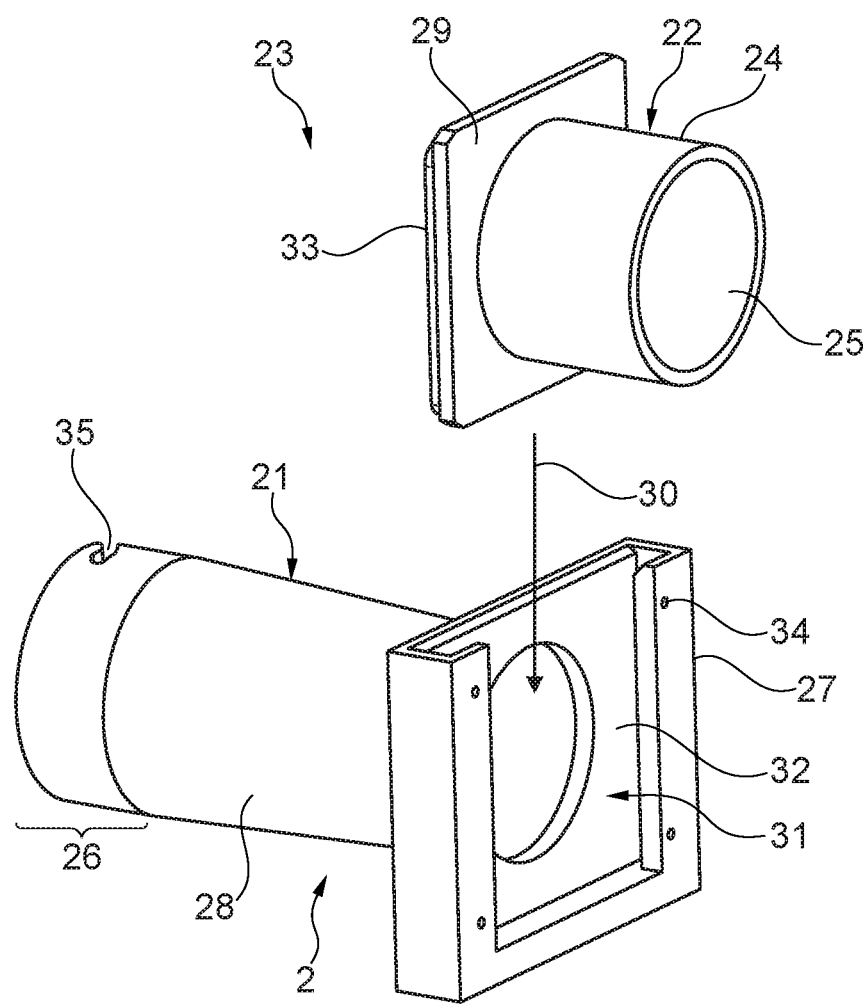
FIG. 3 shows a schematic and perspective representation of an exemplary embodiment of an adapter component and a measurement device of the measurement system.

FIG. 3 shows a schematic and perspective representation of an exemplary embodiment of an adapter component 21 and a measurement device 22 of a measurement system 23 for determining at least one parameter of an air flow emanating from an air outlet that is not shown, with which an air flow can be directly introduced into a passenger compartment of a vehicle that is not shown.

The measurement system 23 has the measurement device 22 for detecting parameter measurement values for the parameter and an air duct system 2 for passing the air flow from the air outlet to the measurement device 22. Of the measurement device 22, only a component section 24 that comprises a tubular section 25 and a radial outward facing connecting flange 29 disposed on the end thereof is shown. Of the air duct system 2, only the adapter component 21 is shown. The collecting unit that is not shown of the air duct system 2 can be embodied according to FIGS. 1 and 2.

The measurement system 23 can comprise analysis electronics that are not shown that are connected to the measurement device 22 on the one hand and the pressure measurement device that is not shown on the other hand and that are designed to correct the parameter measurement values using pressure measurement values detected with the pressure measurement device. The analysis electronics can also be designed to determine average pressure measurement values from the pressure measurement values detected by means of two different measurement chambers that are not shown of the collecting unit and to use the average pressure measurement values for correction of the parameter measurement values.

The adapter component 21 comprises a first coupling end section 26 for connecting the adapter component 21 to the collecting unit that is not shown, a second coupling end section 27 for connecting the adapter component 21 to the measurement device 22 and an intermediate tubular center section 28. The second coupling end section 27 is embodied for positive-locking acceptance of the connecting flange 29 of the component section 24 of the measurement device 22, wherein the connecting flange 29 can be inserted into a holder 31 on the second coupling end section 27 by moving the component section 24 according to the arrow 30 shown. An elastic sealing element 32 is disposed in the holder 31 that is in air-tight contact with the connecting flange 29 when the flange has been inserted into the holder 31. For this purpose, a circumferential sealing bead 33 is formed on the connecting flange 29 that is pressed against the sealing element 32 when the connecting flange 29 is in the holder 31. The air duct system 2 can comprise at least one mechanical securing means that is not shown for securing the connection between the adapter component 21 and the measurement device 22. For example, threaded joints that are not shown can be disposed on the second coupling end section 27, for which bores 34 are formed on the second coupling end section 27.

The collecting unit that is not shown comprises a connecting section at the outlet end section thereof for connecting the collecting unit to the adapter component 21, wherein the connecting section can be embodied according to FIGS. 1 and 2. The connecting section of the collecting unit and the first coupling end section 26 of the adapter component 21 form a bayonet connector. For this purpose, the connecting section is embodied according to FIGS. 1 and 2, so that the bayonet protrusions that are not shown of the connecting section can each be inserted into a dedicated bayonet receptacle 35 on the first coupling end section 26 in order to close the bayonet connector.

Figure 4:
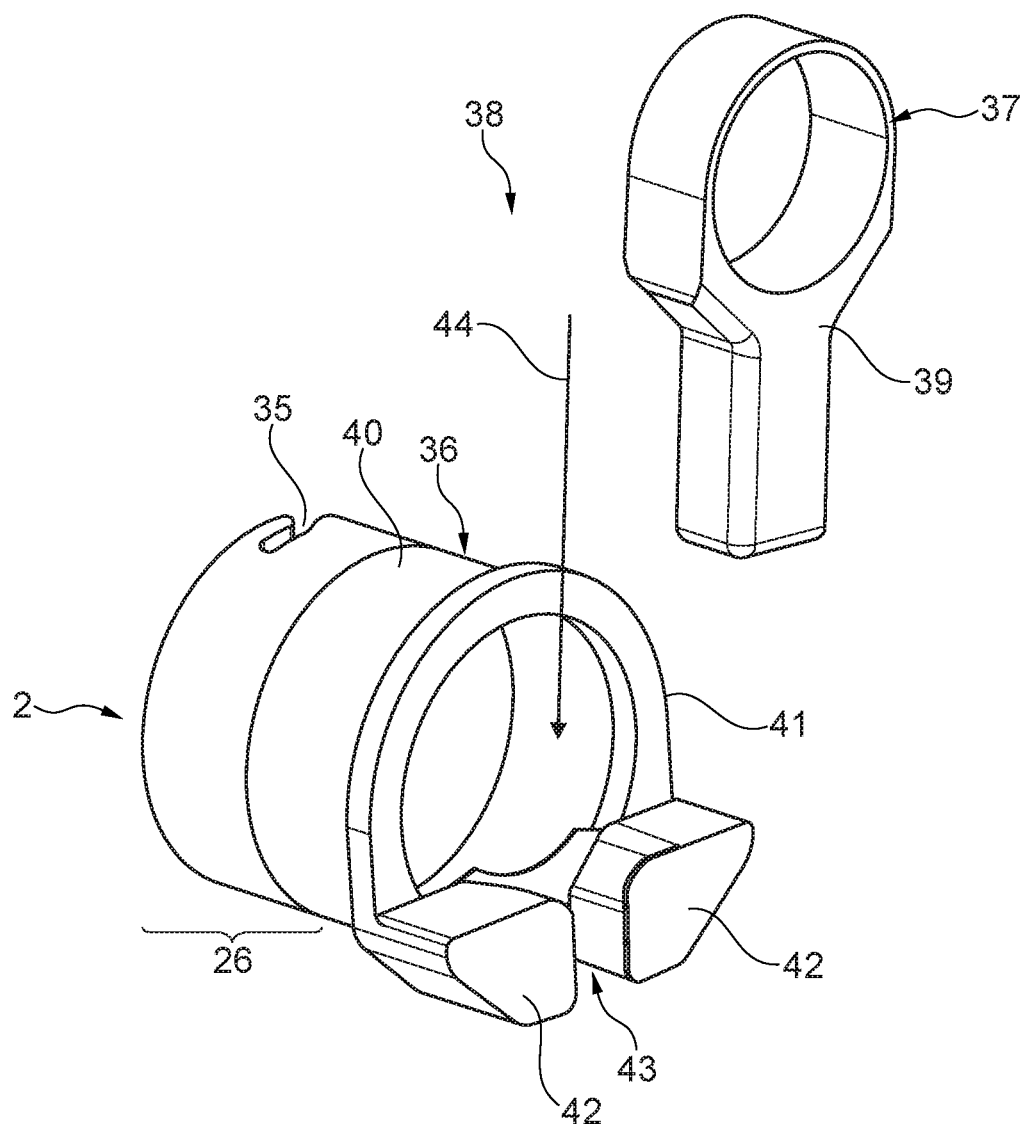
FIG. 4 shows a schematic and perspective representation of a further exemplary embodiment of an adapter component and a measurement device of the measurement system.

FIG. 4 shows a schematic and perspective representation of a further exemplary embodiment of an adapter component 36 and a measurement device 37 of a measurement system for determining at least one parameter of an air flow emanating from an air outlet that is not shown, with which an air flow can be introduced directly into a passenger compartment of a vehicle that is not shown.

The measurement system 38 comprises the measurement device 37 for detecting parameter measurement values of the parameter and an air duct system 2 for passing the air flow from the air outlet to the measurement device 37. Only a component section 39 of the measurement device 37 is shown. Only the adapter component 36 of the air duct system 2 is shown. The collecting unit that is not shown of the air duct system 2 can be embodied according to FIGS. 1 and 2.

The measurement system 38 can comprise analysis electronics that are not shown and that are connected to the measurement device 37 on the one hand and the pressure measurement device that is not shown on the other hand, wherein the analysis electronics are designed to correct parameter measurement values using pressure measurement values detected by the pressure measurement device. The analysis electronics can also be designed to determine average pressure measurement values of pressure measurement values detected by means of two different measurement chambers that are not shown of the collecting unit, and to use the average pressure measurement values for correction of the parameter measurement values.

The adapter component 36 differs from the exemplary embodiment shown in FIG. 3 as a result of the shorter axial length of the tubular central section 40 thereof and as a result of the design of the second coupling end section 41 thereof. The second coupling end section 41 comprises two retaining elements 42 that are disposed spaced apart from each other, between which is disposed a holder 43 for positive-locking accommodation of a section of the component section 39 of the measurement device 37 shown. Said section can be inserted into the holder 43 with positive locking by a movement of the component section 39 according to the arrow 44 shown. Furthermore, to avoid repetition reference is made to the above description of FIG. 3 regarding the description of the adapter component 36. As can be seen in particular from a synopsis of FIGS. 3 and 4, the first coupling sections 26 of the adapter components 36 (and 21 of FIG. 3) are the same.

What is claimed:

1. A measurement system for determining at least one parameter of an air flow emanating from an air outlet, with which the air flow can be introduced directly into a passenger compartment of a vehicle, comprising at least one measurement device detecting parameter measurement values of a parameter and at least one air duct system passing the air flow from the air outlet to the measurement device, wherein the at least one air duct system a collecting unit collecting the air flow emanating from the air outlet, wherein a contact surface of the collecting unit encloses at least one outlet opening of the air outlet circumferentially, said collecting unit including a wall defining a continuous air duct with an inlet end section and an outlet end section; characterized by at least two measurement chambers communicatively connected to the section of the air duct, wherein the at least two measurement chambers are (a) closed relative to the surroundings and (b) contain at least one pressure sensor or comprise at least one connection for communicatively connecting a respective measurement chamber to at least one pressure measurement device.

2. The measurement system as claimed in claim 1, characterized by at least one electronic means of analysis that is connected to one of (a) the measurement device and (b) the pressure sensor or the pressure measurement device, and that is designed to correct the parameter measurement values using pressure measurement values detected with the pressure sensor or the pressure measurement device.

3. The measurement system as claimed in claim 2, wherein the at least one electronic means of analysis is designed to determine average pressure measurement values from at least two pressure measurement values detected by means of different measurement chambers and to use the average pressure measurement values for correction of the parameter measurement values.

\* \* \* \* \*